US011362747B2

(12) United States Patent
Modi

(10) Patent No.: US 11,362,747 B2
(45) Date of Patent: *Jun. 14, 2022

(54) VEHICLE-BASED MEDIA SYSTEM WITH AUDIO AD AND VISUAL CONTENT SYNCHRONIZATION FEATURE

(71) Applicant: Gracenote, Inc., Emeryville, CA (US)

(72) Inventor: Nisarg A. Modi, San Ramon, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,394

(22) Filed: Jan. 28, 2021

(65) Prior Publication Data

US 2021/0152263 A1 May 20, 2021

Related U.S. Application Data

(63) Continuation of application No. 16/516,029, filed on Jul. 18, 2019, now Pat. No. 10,931,390.

(Continued)

(51) Int. Cl.
*H04N 21/414* (2011.01)
*H04N 21/422* (2011.01)
(Continued)

(52) U.S. Cl.
CPC ......... *H04H 20/62* (2013.01); *G01C 21/3605* (2013.01); *G01C 21/3667* (2013.01);
(Continued)

(58) Field of Classification Search
CPC .... H04H 20/62; H04H 2201/90; H04H 60/58; H04H 60/64; H04H 60/375; G10L 15/26;
(Continued)

(56) References Cited

U.S. PATENT DOCUMENTS 5,612,729 A 3/1997 Ellis et al.
5,712,953 A * 1/1998 Langs ............... G10H 3/125
704/208

(Continued)

FOREIGN PATENT DOCUMENTS

CN 102550039 A 7/2012
GB 2375907 A 11/2002
(Continued)

OTHER PUBLICATIONS

C. Olaverri-Monreal, C. Lehsing, N. Trübswetter, C. A. Schepp and K. Bengler, "In-vehicle displays: Driving information prioritization and visualization," 2013 IEEE Intelligent Vehicles Symposium (IV), 2013, pp. 660-665, doi: 10.1109/IVS.2013.6629542. (Year: 2013).*

(Continued)

*Primary Examiner* — Cynthia M Fogg
(74) *Attorney, Agent, or Firm* — McDonnell Boehnen Hulbert & Berghoff LLP

(57) ABSTRACT

In one aspect, an example method to be performed by a vehicle-based media system includes (a) receiving audio content; (b) causing one or more speakers to output the received audio content; (c) using a microphone of the vehicle-based media system to capture the output audio content; (d) identifying reference audio content that has at least a threshold extent of similarity with the captured audio content; (e) identifying visual content based at least on the identified reference audio content; and (f) outputting, via a user interface of the vehicle-based media system, the identified visual content.

18 Claims, 5 Drawing Sheets

Related U.S. Application Data

(60) Provisional application No. 62/714,623, filed on Aug. 3, 2018, provisional application No. 62/714,619, filed on Aug. 3, 2018, provisional application No. 62/714,621, filed on Aug. 3, 2018.

(51) Int. Cl.
| | |
|---|---|
| *H04N 21/81* | (2011.01) |
| *H04H 20/62* | (2008.01) |
| *G10L 19/018* | (2013.01) |
| *H04W 4/02* | (2018.01) |
| *H04W 4/44* | (2018.01) |
| *G01C 21/36* | (2006.01) |
| *H04R 3/12* | (2006.01) |
| *G06Q 30/02* | (2012.01) |
| *G10L 15/26* | (2006.01) |

(52) U.S. Cl.
CPC ..... *G01C 21/3697* (2013.01); *G06Q 30/0239* (2013.01); *G06Q 30/0266* (2013.01); *G06Q 30/0267* (2013.01); *G06Q 30/0277* (2013.01); *G10L 15/26* (2013.01); *G10L 19/018* (2013.01); *H04N 21/41422* (2013.01); *H04N 21/42203* (2013.01); *H04R 3/12* (2013.01); *H04W 4/023* (2013.01); *H04W 4/44* (2018.02); *H04N 21/812* (2013.01); *H04R 2499/13* (2013.01)

(58) Field of Classification Search
CPC . G10L 19/018; G10L 25/51; H04N 21/41422; H04N 21/42203; H04N 21/812; H04N 21/4126; H04N 21/4784; H04N 21/8106; G06Q 30/0266; G06Q 30/0267; G06Q 30/0277; G06Q 30/0239; H04W 4/023; H04W 4/44; H04W 4/48; H04W 4/23; H04W 4/02; G01C 21/3605; G01C 21/3697; G01C 21/3667; G01C 21/3608; G01C 21/3664; H04R 3/12; H04R 2499/13; H04M 1/72412; H04L 65/607; H04L 65/4076; H04L 67/20; H04L 67/18; H04L 67/125; H04L 67/12; G11B 27/10
USPC .......................................................... 725/32
See application file for complete search history.

(56) References Cited

U.S. PATENT DOCUMENTS

| | | | |
|---|---|---|---|
| 2013/0318114 A1* | 11/2013 | Emerson, III | G06F 16/24 707/758 |
| 2014/0172961 A1 | 6/2014 | Clemmer et al. | |
| 2014/0201004 A1 | 7/2014 | Parundekar et al. | |
| 2015/0199968 A1 | 7/2015 | Singhal et al. | |
| 2015/0256905 A1 | 9/2015 | Lee et al. | |
| 2015/0319506 A1 | 11/2015 | Kansara et al. | |
| 2016/0360019 A1 | 12/2016 | Ellis | |
| 2017/0115954 A1* | 4/2017 | Innes | G06F 40/226 |
| 2017/0309298 A1 | 10/2017 | Scott et al. | |
| 2018/0158255 A1* | 6/2018 | Garcia | B60Q 1/52 |
| 2018/0176741 A1* | 6/2018 | Cremer | H04L 67/22 |
| 2018/0189020 A1 | 7/2018 | Oskarsson et al. | |
| 2019/0028766 A1* | 1/2019 | Wold | H04N 21/4665 |

FOREIGN PATENT DOCUMENTS

| | | |
|---|---|---|
| KR | 1020090057813 A | 6/2009 |
| WO | WO2012/097148 A2 | 7/2012 |
| WO | WO2015/188630 A1 | 12/2015 |

OTHER PUBLICATIONS

International Search Report dated Nov. 8, 2019 issued in connection with International Application No. PCT/US2019/043078, filed on Jul. 23, 2019, 3 pages.
Written Opinion of the International Searching Authority dated Nov. 8, 2019 issued in connection with International Application No. PCT/US2019/043078, filed on Jul. 23, 2019, 6 pages.

* cited by examiner

VEHICLE-BASED MEDIA SYSTEM WITH AUDIO AD AND VISUAL CONTENT SYNCHRONIZATION FEATURE

CROSS-REFERENCE TO RELATED APPLICATIONS

This application is a continuation of U.S. patent application Ser. No. 16/516,029, filed on Jul. 18, 2019, which claims priority to U.S. Provisional Patent Application No. 62/714,619, filed on Aug. 3, 2018, U.S. Provisional Patent Application No. 62/714,621, filed on Aug. 3, 2018, and U.S. Provisional Patent Application No. 62/714,623, filed on Aug. 3, 2018, each of which is hereby incorporated by reference in its entirety. Additionally, this application hereby incorporates by reference the entire contents of U.S. patent application Ser. No. 16/516,035, filed on Jul. 18, 2019, and U.S. patent application Ser. No. 16/516,045, filed on Jul. 18, 2019.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

BACKGROUND

Vehicle-based media systems can receive media content to be presented to an occupant of a vehicle. For example, a vehicle-based media system can include an antenna configured to receive a radio signal, such as a satellite radio signal or a terrestrial radio signal, that is carrying audio content, and the vehicle-based media system can output the audio content through one or more speakers located within the vehicle.

SUMMARY

In one aspect, an example vehicle-based media system is disclosed. The example vehicle-based media system comprises (a) a user interface, (b) a microphone, (c) one or more processors, and (d) a non-transitory, computer-readable medium storing instructions that, when executed by the one or more processors, cause the vehicle-based media system to perform a set of acts comprising: (a) receiving audio content; (b) causing one or more speakers to output the received audio content; (c) using the microphone of the vehicle-based media system to capture the output audio content; (d) identifying reference audio content that has at least a threshold extent of similarity with the captured audio content; (e) identifying visual content based at least on the identified reference audio content; and (f) outputting, via the user interface of the vehicle-based media system, the identified visual content.

In another aspect, an example method to be performed by a vehicle-based media system is disclosed. The method includes (a) receiving audio content; (b) causing one or more speakers to output the received audio content; (c) using a microphone of the vehicle-based media system to capture the output audio content; (d) identifying reference audio content that has at least a threshold extent of similarity with the captured audio content; (e) identifying visual content based at least on the identified reference audio content; and (f) outputting, via the user interface of the vehicle-based media system, the identified visual content.

In another aspect, an example non-transitory computer-readable medium is disclosed. The computer-readable medium has stored thereon program instructions that, upon execution by a vehicle-based media system, cause the vehicle-based media system to perform a set of operations comprising (a) receiving audio content; (b) causing one or more speakers to output the received audio content; (c) using a microphone of the vehicle-based media system to capture the output audio content; (d) identifying reference audio content that has at least a threshold extent of similarity with the captured audio content; (e) identifying visual content based at least on the identified reference audio content; and (f) outputting, via the user interface of the vehicle-based media system, the identified visual content.

DETAILED DESCRIPTION

I. Overview

Figure 1:
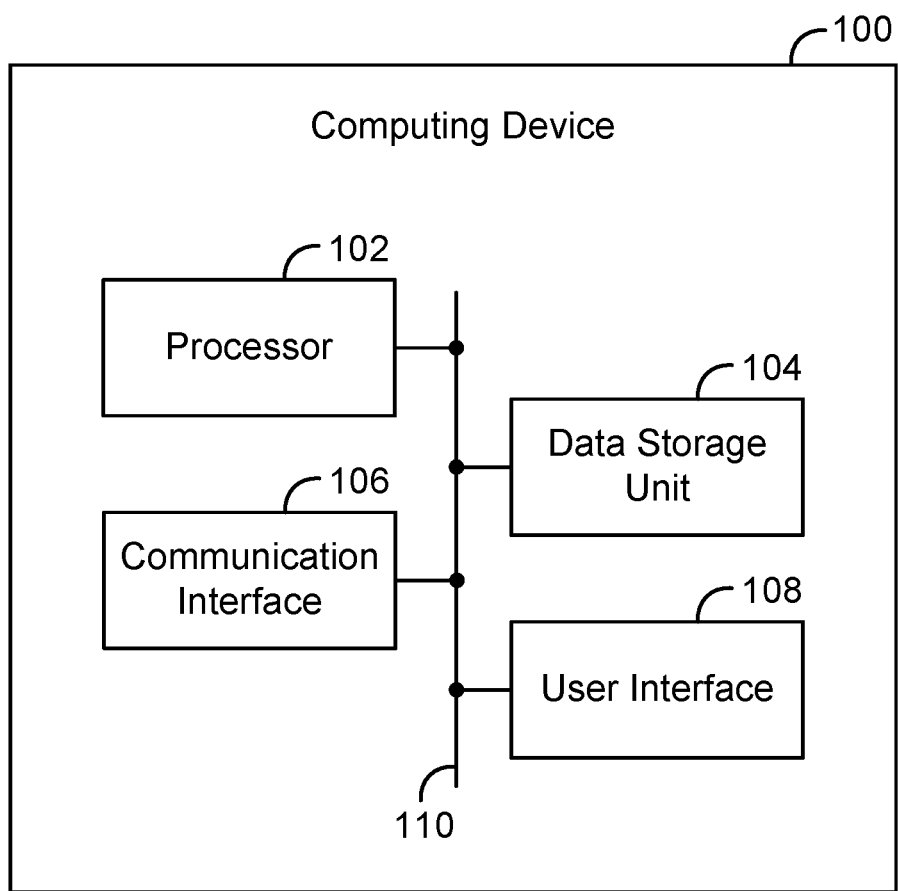
FIG. 1 is a simplified block diagram of an example computing device.

A vehicle-based media system receives audio content over a radio broadcast and presents the received audio content to an occupant of a vehicle, for instance, by playing the audio content through one or more speakers of the vehicle. The audio content received and played back by the vehicle-based media system can include various types of audio content. For instance, the audio content can include primary content, such as music, radio programs, or the like, and the audio content can include secondary content, such as advertisements, interspersed among the primary content.

Some vehicle-based media systems include a visual display for displaying visual information to an occupant of a vehicle. Such a vehicle-based media system can be configured to display information related to audio content being played back by the media system. For instance, while the media system is playing audio content, the media system can cause the visual display to display information identifying the audio content, such as a title and/or artist of a song, or identifying a source of the audio content, such as a radio station that is broadcasting the audio content. Such information to be displayed by the vehicle-based media system can be encoded in the radio broadcast that is carrying the audio content, and the vehicle-based media system can extract this information from the radio broadcast.

In practice, when the vehicle-based media system receives primary content from the radio broadcast, such as a song or a radio program, the vehicle-based media system can obtain, from the radio broadcast, and display, via its visual display, information identifying the song or radio program and/or a source of the song or radio program. For instance, for a terrestrial radio broadcast, such as a frequency modulation (FM) radio broadcast, information can be encoded into the radio signal according to the Radio Broadcast Data System (RBDS) communication protocol. Other examples are possible as well.

In some scenarios, however, the vehicle-based media system might not receive from the radio broadcast any visual information to be displayed, or the occupant of the vehicle may wish to receive additional or alternative information than that which the vehicle-based media system receives from the radio broadcast. For instance, when the vehicle-based media system receives secondary content, such as an advertisement, from the radio broadcast, the radio signal may not be encoded with visual information for display by the vehicle-based media system, or the radio signal may merely be encoded with visual information identifying the radio station broadcasting the advertisement or with various other visual information unrelated to the content of the advertisement. However, an occupant of the vehicle may wish to obtain further information about the advertisement, and/or a business associated with the advertisement may wish to provide further information to the occupant of the vehicle.

Disclosed herein are methods and systems to address this and potentially other issues. In an example method, while a vehicle-based media system is presenting an audio advertisement, the vehicle-based media system determines an audio fingerprint of the advertisement. For example, the vehicle-based media system can receive audio content. This received audio content can also be different types of audio content, including music by various artists or other radio programs (collectively, "entertainment content") and/or audio advertisements (collectively, "advertisement content").

Once this audio content is received, the vehicle-based media system may also cause one or more speakers in (or around) the vehicle to output the received audio content, and then, using a microphone of the system, capture the outputted audio content. In some examples, the vehicle-based media system can also selectively capture the audio content based on various attributes of the received audio content (e.g., capturing the advertisement content).

The vehicle-based media system may also identify reference audio content that has at least a threshold extent of similarity with the captured audio content and can do so in various ways. For instance, the reference audio content can include a plurality of reference audio fingerprint items, and the vehicle-based media system can generate audio fingerprint data associated with the captured audio content, compare the generated audio fingerprint data to the plurality of reference audio fingerprint items, and determine that a particular reference audio fingerprint item of the plurality of reference audio fingerprint items has at least a threshold extent of similarity with the generated audio fingerprint data. In another aspect, the vehicle-based media system may do some or all of this analysis locally or using other devices and/or processes (e.g., the vehicle-based media system can send the captured audio content (or a portion thereof) to a server, and the server can generate audio fingerprint data associated with the captured audio content and/or perform the comparative analysis). And, in yet another aspect, the vehicle-based media system can also identify reference audio content based on specific audio content with specific attributes (e.g., capturing advertisement content contained in the received audio content and using the captured advertisement content to identify reference audio content).

In any case, the vehicle-based media system may also use the identified reference audio content to identify associated visual content. Namely, the vehicle-based media system may use the reference audio content that has the threshold extent of similarity with the captured audio content to retrieve the visual content. For instance, the threshold similar reference audio content can be associated with a particular video content item, and the vehicle-based media system can retrieve the particular video content item based on its association with the threshold similar reference audio content item.

Further, the vehicle-based media system may output, via the user interface of the vehicle-based media system, the identified visual content, and may do so in a number of ways. For example, the identified visual content may be related to particular advertisement content contained in the captured audio content and may be displayed while the audio advertisement is playing in the vehicle. In a further aspect, this visual content may contain additional content that can increase opportunities for (and the likelihood of) an occupant's interactions with the advertisement content. For example, the displayed visual content corresponding to a particular advertisement may include a scannable image that, when scanned by a computing device (e.g., an occupant's mobile computing device), causes the computing device to retrieve data associated with the particular advertisement content. In some examples, this may include the use of matrix barcodes, such as Quick Response (QR) codes and/or other image recognition technologies. Other examples are possible.

Further, in response to scanning the image, the computing device may take additional actions that can further increase the occupant's interactions with the advertisement content (and therefore the underlying product/service advertised therein). For example, in response to scanning the displayed image, the computing device may navigate to a content host (e.g., a web page associated with the particular advertisement content, a server associated with the particular advertisement content, etc.) and retrieve additional content that the occupant and/or other occupants may be interested in (e.g., a coupon associated with the particular advertisement content and/or associated business). In a further aspect, in response to scanning the displayed image, the computing device, the vehicle-based media system, or both, may display information that the occupant may also be interested (e.g., display an indication of one or more geographic locations of the associated business).

II. Example Architecture

A. Computing Device

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a radio, cellular, or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

In this disclosure, the term "computing system" means a system that includes at least one computing device, such as computing device 100. A computing system and/or components thereof can perform various acts, such as those set forth below.

In this disclosure, the term "vehicle-based media system" means a system that includes at least one computing device, such as computing device 100, and that receives and presents media content to an occupant of a vehicle. The vehicle-based media system can receive the media content using a communication interface, such as communication interface 106, and can present the media content using a user interface, such as user interface 108.

II. Example Operations

In line with the discussion above, a vehicle-based media system can receive, via a radio broadcast, an audio advertisement, and the vehicle-based media system can present the audio advertisement to an occupant of the vehicle by outputting the audio advertisement through one or more speakers of the vehicle. To enhance the occupant's experience, the vehicle-based media system can identify the advertisement and can use the identified advertisement as a basis to retrieve visual content. The vehicle-based media system can then cause the retrieved visual content to be presented on a display screen of the vehicle-based media system while the vehicle-based media system presents at least a portion of the advertisement. In one example use case, the vehicle-based media system can receive and present a terrestrial radio advertisement for a restaurant and while doing so, the vehicle-based media system can display an image of a food item available at the restaurant together with a scannable identifier, such as a QR code, that links to a corresponding coupon.

One way to identify the advertisement being received by the vehicle-based media system is for the vehicle-based media system to generate audio fingerprint data representing the advertisement content being received by the vehicle-based media system, and for a computing system, such as a network server, to compare that audio fingerprint data with reference audio fingerprint data representing advertisement content of a known advertisement, with a fingerprint match indicating that the vehicle-based media system is receiving the known advertisement.

To do so, the vehicle-based media system may use one or more microphones to capture audio content that is played via one or more speakers in the vehicle. For instance, the vehicle-based media system may receive various audio content from a particular source (e.g., both entertainment and advertisement content contained in signals from a terrestrial radio station) and selectively capture specific audio content (e.g., advertisement content) for further analysis. To facilitate this, the vehicle-based media system may be configured to continuously monitor audio content that is being played in the vehicle during background processing and begin capturing the audio only upon recognizing one or more predetermined audio patterns. For instance, the vehicle-based media system can be configured to begin capturing audio content responsive to detecting a period of silence or lack of music content, as this can be indicative of the end of a song and the beginning of an advertisement.

In another example, the vehicle-based media system can be configured to capture audio content responsive to detecting changes in the received audio content. For instance, the vehicle-based media system can be configured to determine that the received audio content no longer includes information identifying the song or radio program and/or a source of the song or radio program, such as information encoded into the radio signal according to the RBDS communication protocol. As noted above, this encoded information might not be present when the received audio content includes advertisement content, and so the lack of this encoded information can indicate that the received audio content includes advertisement content.

In another example, the vehicle-based media system may be configured to continuously or periodically monitor the audio content that is being played in the vehicle and capture the audio content for further analysis. In some examples, the vehicle-based media system may periodically capture the audio content and perform audio analysis (e.g., fingerprinting, finding other audio content that matches the captured audio content, etc.) in real time or near real time. In other examples, however, the vehicle-based media system may periodically capture the audio content and defer audio analysis until a later time.

In still other examples, the vehicle-based media system may engage the one or more microphones to capture audio content based on the presence (or absence) or particular information in the received audio content. In some examples, the vehicle-based media system may begin capturing audio content playing back in the vehicle in response to determining that the received audio content does not contain information indicating that the audio content is musical audio content (e.g., song and/or artist title), and therefore is likely advertising content. Other examples are possible.

In any case, the vehicle-based media system can determine a fingerprint for the captured audio content, and may do so in a number of ways. For example, a network server or other such entity could establish or otherwise have access to reference audio fingerprint data representing a known advertisement. For instance, the server could receive various audio advertisements and, for each audio advertisement, could generate respective reference audio fingerprints representing the respective audio advertisements. Or the server could otherwise establish or be provisioned with these reference audio fingerprints. The fingerprints determined by the vehicle-based media system and/or the reference audio fingerprints can be generated according to any audio fingerprinting process now known or later developed.

Further, in real time as the vehicle-based media system receives an audio advertisement, the vehicle-based media system could generate query audio fingerprint data representing the audio content of the advertisement that it is receiving and could transmit the query audio fingerprint data to the server for analysis.

As the server receives the query audio fingerprint data from the vehicle-based media system, the server could compare the query audio fingerprint data with the reference audio fingerprint data of the known advertisements. And if the server thereby determines with sufficient confidence that the query audio fingerprint data matches particular reference audio fingerprint data, then the server could conclude that the advertisement being received by the vehicle-based media system is the known advertisement represented by the particular reference audio fingerprint data. Further, upon reaching such a conclusion, the server could transmit, to the vehicle-based media system, information associated with the advertisement (e.g., a logo, a brand name, etc., associated with the advertisement and/or the associated business).

In other examples, once the advertisement that is being received by the vehicle-based media system has been identified, the identified advertisement can be used as a basis to retrieve visual content. For instance, the server could receive or be provisioned with respective visual content associated with each respective known advertisement, and the vehicle-based media system could retrieve, from the server, the respective visual content associated with the identified advertisement. In yet other examples, the vehicle-based media system may perform some or all of these functions locally, on the system itself.

In any event, once the visual content is received and/or retrieved by the vehicle-based media system, the system can then display the retrieved visual content, and this display can take various forms. As noted above, for instance, the visual content could include a scannable identifier, such as a QR code, that when scanned causes another computing device to access additional content associated with the advertisement. In one example, an occupant of the vehicle could scan the QR code with a mobile phone, and the mobile phone could responsively retrieve a coupon for use at the business associated with the advertisement. In another example, responsive to scanning the QR code, the mobile phone could display a logo or product information associated with the advertisement and/or the business (e.g., after scanning the scannable image, the mobile phone could be directed to a website of the business associated with the advertisement). Other examples are possible as well.

As a related feature, the vehicle-based media system can also determine location data associated with the vehicle. The location data can include a current location of the vehicle, a destined location of the vehicle, or some location on a route between the current and destined locations of the vehicle, as obtained from a navigation system of the vehicle. The vehicle-based media system can use both the identified advertisement and the determined location data as a basis to retrieve the visual content. For instance, the vehicle-based media system can receive and present a terrestrial radio advertisement for a restaurant chain and while doing so, the media system can display a location of one of the restaurants.

In some examples, the vehicle-based media system can also use the determined location data of the vehicle to determine whether to retrieve particular visual content. To facilitate this, the server can be further provisioned with respective location data associated with each respective advertisement. For instance, the location data for a particular advertisement can include an address or GPS coordinates of a business associated with the advertisement. In such a scenario, the vehicle-based media system can be configured to only retrieve visual content for advertisements that are associated with a location within a threshold distance (e.g., within a five mile radius) of the current location of the vehicle, destined location of the vehicle, or some location on a route between the current and destined locations.

Alternatively, the vehicle-based media system can determine that the vehicle location data identifies a location that is not within the threshold proximity/distance to the location associated with the particular advertisement. In such a scenario, even if a fingerprint match is detected when comparing the query audio fingerprint data with the reference audio fingerprint data of the particular advertisement, the vehicle-based media system can refrain from retrieving and displaying visual content associated with the matched reference fingerprint data based on the matched reference fingerprint data being associated with a location that is at least the threshold distance away from the location indicated by the vehicle location data.

Further, in some examples, location data for a particular advertisement can include location data for multiple locations. For instance, as noted above, the particular advertisement might be an advertisement for a chain of restaurants, and the location data for the particular advertisement can include location data for each restaurant of the chain of restaurants. As such, the vehicle-based media system can be configured to consider the nearest restaurant location when determining whether to perform the navigation-related action. For instance, if the nearest restaurant is within the threshold proximity/distance of the vehicle-based media system location, then the vehicle-based media system can perform the navigation-related action, such as by displaying a prompt to navigate the vehicle to the nearest restaurant location. Alternatively, if the nearest restaurant is not within the threshold proximity/distance of the vehicle-based media system location, then the vehicle-based media system can refrain from performing the navigation-related action.

In any event, the vehicle-based media system, an occupant's mobile device, or both may take actions that result in additional content related to the advertisement being displayed for one or more occupants and thereby increase therein interactions with (and interest in) the advertisement (and the underlying business/products/services advertised therein). In a further aspect, the vehicle-based media system may also store the associated information (e.g., reference audio content, associated visual content, the occupant's interactions with the visual content, or all of the above) for future use by the media system.

A. Example GUIs and Operational Environments

Figure 2A:
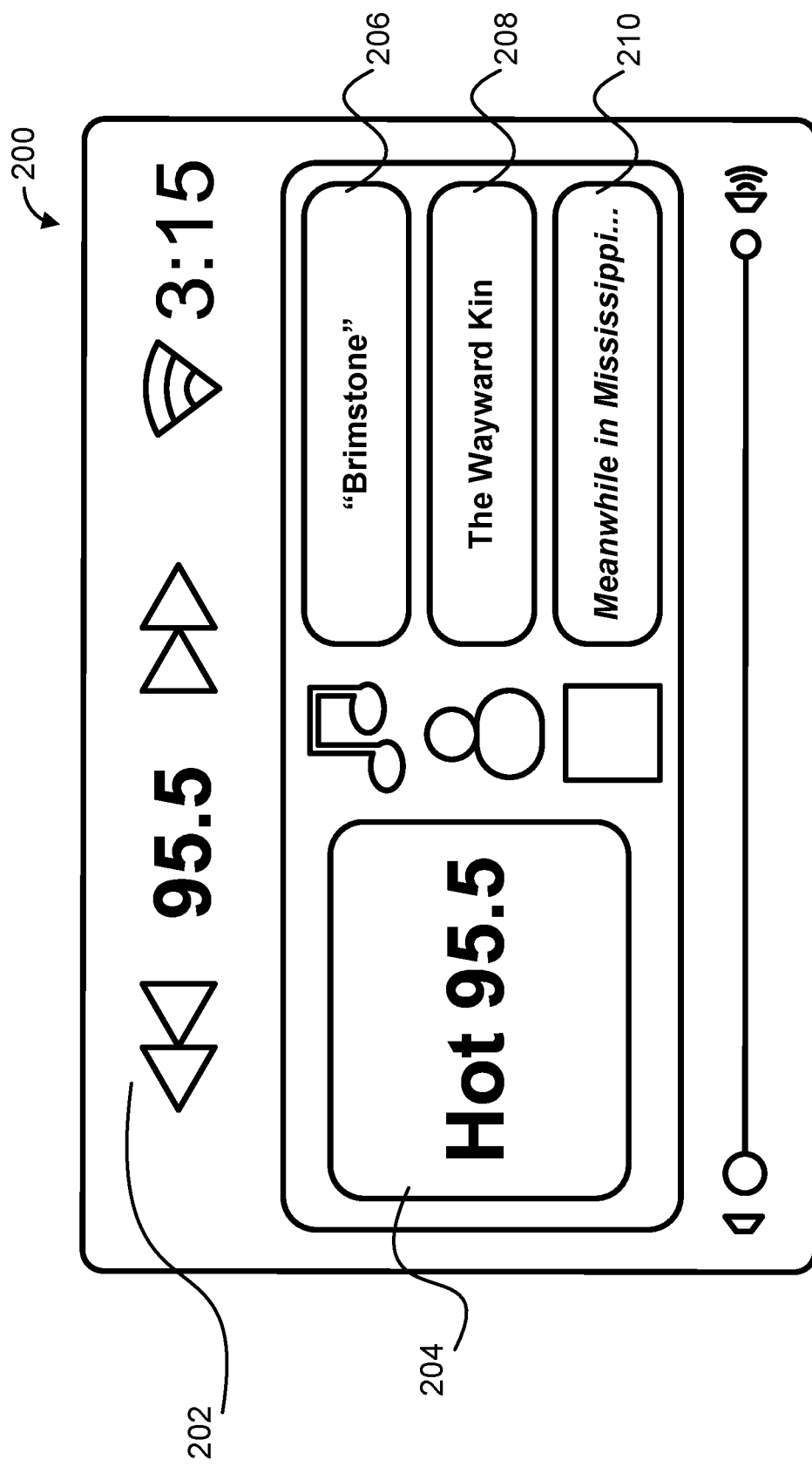
FIG. 2A is an example graphical user interface ("GUI") in a first state.
Figure 2B:
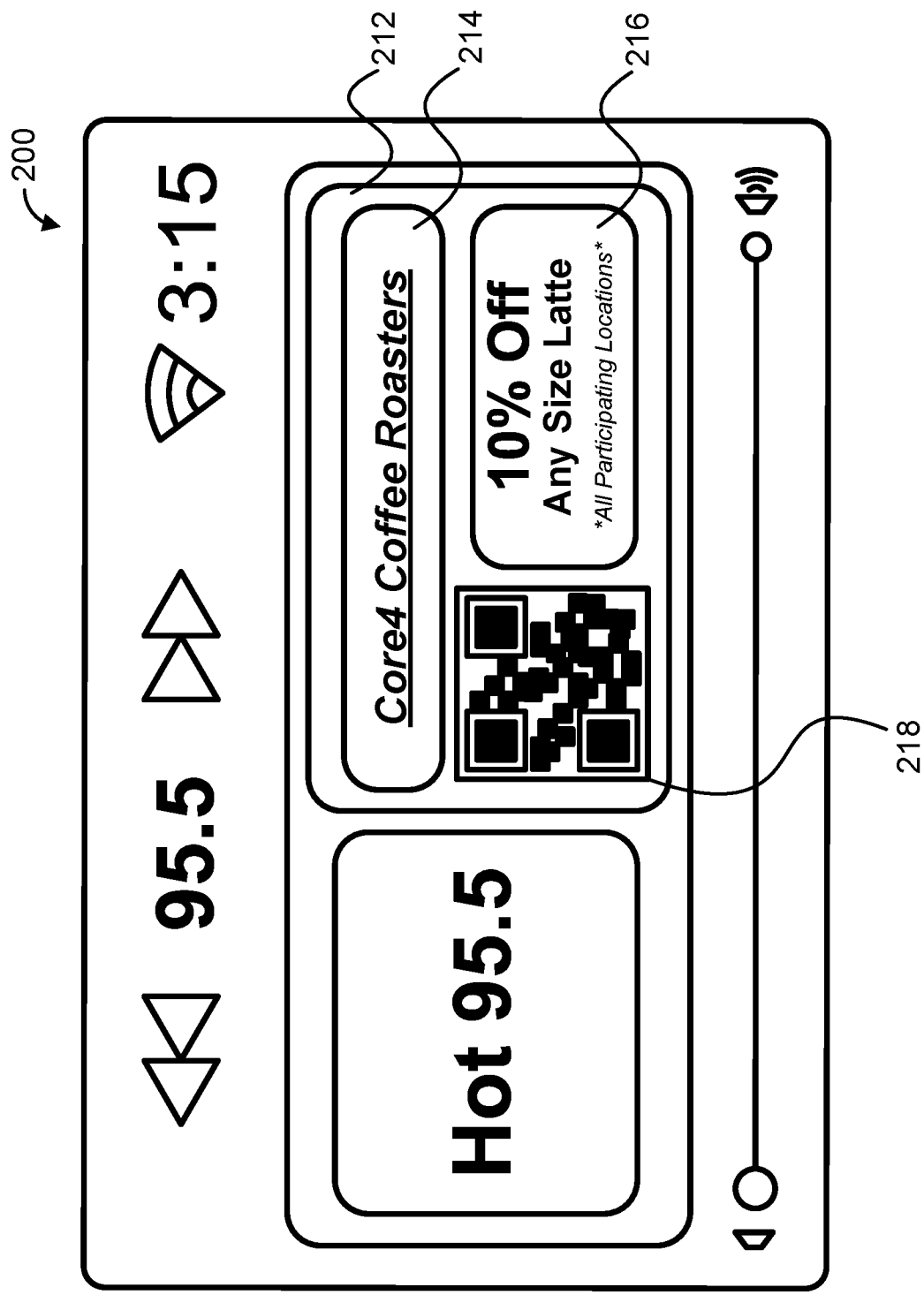
FIG. 2B is the example GUI of FIG. 2A, but in a second state.
Figure 2C:
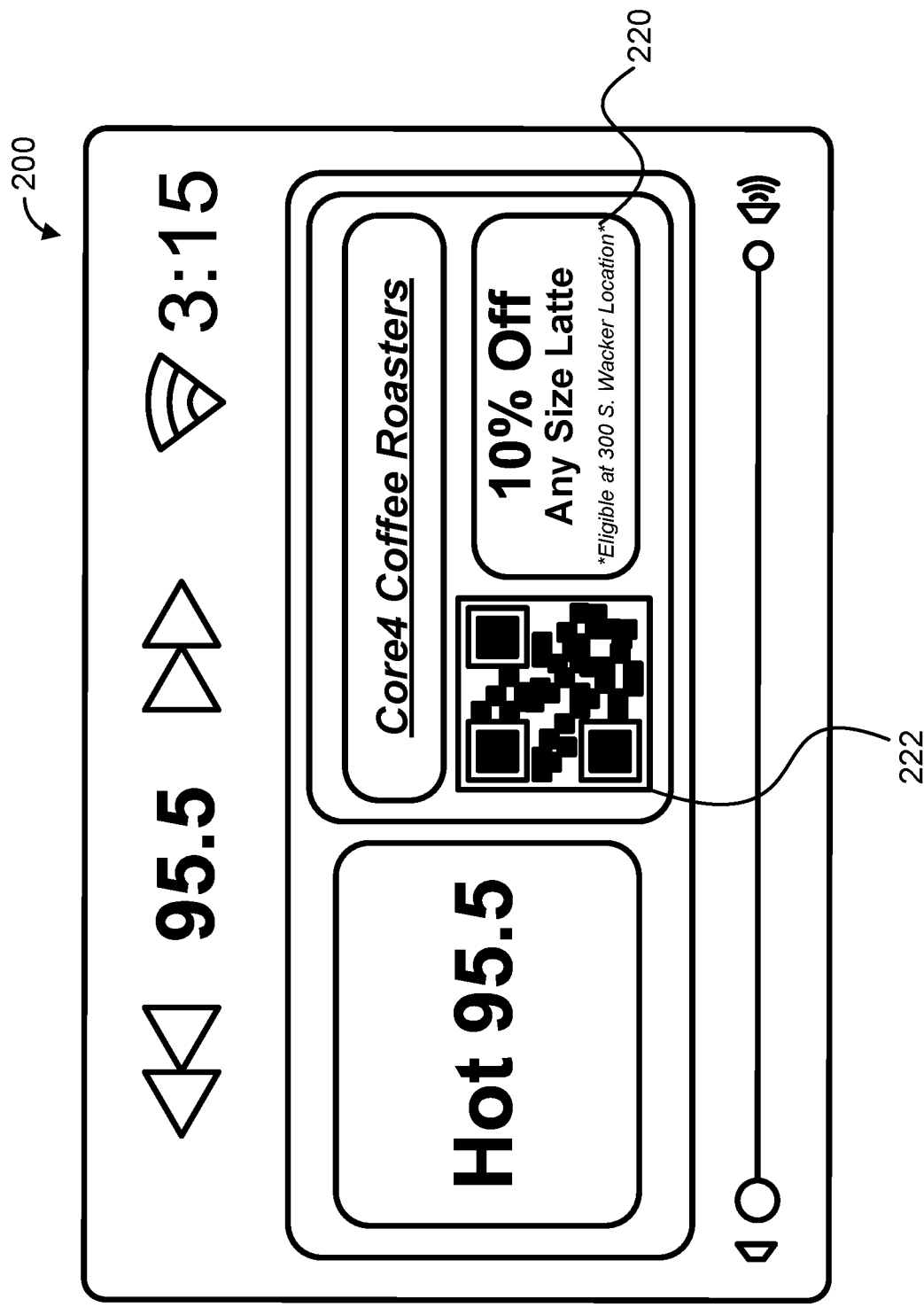
FIG. 2C is the example GUI of FIG. 2A, but in a third state.

To further illustrate the above-described concepts and others, FIGS. 2A-2C depict example GUIs that a vehicle-based media system 200 can be configured to display in accordance with the techniques described above. The vehicle-based media system 200 can include one or more computing devices similar to or the same as the computing device 100 depicted in FIG. 1. Further, the example environments and GUIs depicted in FIGS. 2A-2C are merely for purposes of illustration. The features described herein can involve environments, operations, GUIs, and functionalities that are configured or formatted differently, include additional or fewer components and/or more or less data, include different types of components and/or data, and relate to one another in different ways.

FIG. 2A depicts an example GUI of the vehicle-based media system 200 in a first state. Specifically, in this first state, the vehicle-based media system 200 displays a radio station 202 ("95.5") in connection with an associated radio station logo 204 ("Hot 95.5") and information indicating a song title 206 ("Brimstone"), artist title 208 ("The Wayward Kin"), and album title 210 ("Meanwhile in Mississippi . . . "), for musical audio content received from the displayed radio station and currently playing on one or more speakers in the vehicle. In line with the discussion above, this information can be encoded into audio content received by the vehicle-based media system, and the vehicle-based media system can extract this information from the received audio content.

Turning to FIG. 2B, FIG. 2B depicts the GUI of vehicle-based media system 200 depicted in FIG. 2A, but in a second state. In the second state, the audio content received by the vehicle-based media system 200 includes advertisement content instead of entertainment content. In this state, instead of displaying information indicating a song title 206, artist title 208, and album title 210 associated with musical audio content playing in the vehicle, vehicle-based media system 200 displays content associated with the advertisement playing on the radio station. During playout of this advertisement, the vehicle-based media system 200 captures the advertisement audio content currently playing on one or more speakers in the vehicle.

In line with the discussion above, the vehicle-based media system 200 can capture the advertisement audio content in a number of ways. For example, vehicle-based media system 200 can include one or more microphones that the vehicle-based media system 200 can use to capture audio content playing in the vehicle during an advertisement. Further, the vehicle-based media system 200 can continuously or periodically monitor audio content that is being played in the vehicle device and begin capturing audio content upon recognizing one or more predetermined audio patterns that might indicate that an advertisement is playing. In this way, the audio content in the vehicle can be continuously monitored for purposes of determining if an advertisement is playing.

In still other examples, the vehicle-based media system 200 may capture audio content in the vehicle based on the presence (or absence) or particular information in the received audio content. For example, the vehicle-based media system 200 may begin capturing audio content playing in the vehicle in response to determining that the received audio content contains information indicating that the audio content is an advertisement. For instance, the vehicle-based media system can begin capturing audio content responsive to determining that the received audio content contains embedded information that indicates the audio content is an advertisement, but does not indicate any details of the advertisement. In other examples, the vehicle-based media system 200 may begin capturing audio content playing in the vehicle in response to determining that the received audio content does not contain certain information. For example, the vehicle-based media system 200 may determine that the audio content does not contain information indicating that the audio content is musical content (e.g., song and/or artist title), and thereby determine that the audio content is more likely than not an advertisement. Other examples are possible.

The vehicle-based media system 200 can also use the captured audio content to identify reference audio content that has at least a threshold extent of similarity with the captured audio content and can do so in a number of ways.

In one example, the vehicle-based media system 200 itself can generate audio fingerprint data based on the captured audio content (e.g., by processing the captured audio content locally) and then send the generated audio fingerprint data to a second computing device (e.g., a network server) with an instruction that causes the second computing device to compare the generated audio fingerprint data to a plurality of reference audio fingerprint items and determine that one or more reference audio fingerprint items have at least a threshold extent of similarity with the generated audio fingerprint data. This similarity may indicate a match between the captured audio content and known reference audio content, thereby allowing the vehicle-based media system 200 to display information about the captured audio content based on its similarity to the known reference audio content (e.g., names and/or slogans for certain businesses).

In another example, the vehicle-based media system 200 can identify the reference audio content locally by generating audio fingerprint data of the captured audio content and comparing the generated audio fingerprint data to a plurality of locally stored reference audio fingerprint items, each of which are associated with respective reference audio content. Then, based on this comparison, the vehicle-based media system 200 can also determine that a particular reference audio fingerprint item has at least a threshold extent of similarity with the generated audio fingerprint data.

In yet another example, the vehicle-based media system 200 can send a portion of the captured audio content to an external computing device (e.g., a network server) with an instruction that causes the external computing device to compare, at least, the portion of the captured audio content to the plurality of reference audio content items. Such a comparison can involve the external computing device generating an audio fingerprint of the portion of the captured audio content and comparing the generated audio fingerprint to respective reference audio fingerprints, each of which can correspond to a respective reference audio content item. Then, once the external computing device performs this comparison, the vehicle-based media system 200 may receive, from the external computing device, an indication of a particular reference audio content item that has at least the threshold extent of similarity with the captured audio content.

Based on the results of this comparison, the vehicle-based media system 200 can also identify visual content associated with the reference audio content. In some examples, to identify this associated visual content, the vehicle-based media system 200 may use the reference audio content corresponding to the fingerprint data of the advertisement to retrieve visual content associated with one or more advertisements, and may do so in a variety of ways. In some examples, the vehicle-based media system 200 may obtain this visual content from local storage and/or from other devices, among other possibilities. In a further aspect, the vehicle-based media system may identify respective visual content for each (or at least some) of the respective reference audio fingerprint item of the plurality of audio fingerprint items based on a variety of factors (e.g., identify visual content that has the greatest extent of similarity with the reference audio content corresponding to the generated audio fingerprint data or multiple visual contents that have at least a threshold extent of similarity with the same).

Further, the vehicle-based media system 200 can use this identified visual content in a number of ways. In one example, the vehicle-based media system 200 may display visual content related to particular advertisement while the advertisement is playing in the vehicle. In a further aspect, this visual content may contain content additional content that increases opportunities for (and the likelihood of) an occupant's interactions with the advertisement content.

For example, as shown in FIG. 2B, the vehicle-based media system 200 displays visual content 212 corresponding to a particular advertisement that includes a business logo 214 (here, "Core4 Coffee Roasters") associated with the advertisement, an offer 216 (here, "10% Off Any Size Latte *All Participating Locations*"), and a scannable image 218 (here, a QR code). Again, this content may increase an occupant's experience with the underlying advertisement content (e.g., by providing even more content to an occupant of the vehicle when scanned by an occupant's mobile computing device). Other examples are possible.

Further, this advertising visual content 212 may be displayed at various times in connection with the underlying advertisement content. For example, advertising visual content 212 may be retrieved and displayed in real time while the underlying advertisement content is playing in the vehicle. Further, the advertising visual content 212 may be displayed only while the underlying advertisement content is playing in the vehicle, during a portion of playback for a subsequent advertisement or musical audio content, for a particular duration (e.g., 30 seconds), persistently until an occupant takes one or more predetermined actions (e.g., scans the associated QR code, or closes the advertisement by interacting with the user interface of the vehicle-based media system), and/or when the vehicle's radio is turned off and/or performing other functionality (e.g., playing a CD), among other possibilities. For example, advertising visual content 212 may also be displayed the next time the vehicle is started, regardless of the audio content that is playing when the vehicle is started. Other examples and uses of associated information are possible.

Turning to FIG. 2C, the GUI of the vehicle-based media system 200 is shown in a third state, where the third state is similar to the second state depicted in FIG. 2B, in that the vehicle-based media system 200 has captured audio content, used that captured audio content to identify reference audio content having at least a threshold similarity with the captured audio content, and identified associated visual content. However, in this third state, the vehicle-based media system 200 has also captured location data of the vehicle and used that location data to identify and display the advertising visual content 212.

Specifically, in order to reach the third state shown in FIG. 2C, at or around the time the vehicle-based media system 200 uses the microphone to capture audio content, the vehicle-based media system 200 can also determine location data of the vehicle (e.g., using GPS). As described above, the vehicle-based media system 200 can use the determined location data to filter out visual content that is associated with locations outside a threshold proximity of the location data and instead only select visual content that is within the threshold proximity of the location data. In this manner, the selected visual content can be location-specific visual content that is associated with a place of business that is relatively near to the vehicle-based media system. As shown in FIG. 2C, the vehicle-based media system can output, in connection with the indication of the identified reference audio content, an indication of the location-specific visual content 220, shown here as "10% Off Any Size Latte *Eligible at 300 S. Wacker Location*". Additionally or alternatively, the location-specific visual content 220 can include offers and/or other content that pertains to the indicated, specific participating locations (e.g., displaying particular menu items found only at a particular location, directions to the particular location, an option to order in advance of arriving at the particular location, etc.). Some or all of this location-specific content can be encoded into scannable image 222. In any event, by displaying location-specific visual content, the occupant's experience with the advertisement (and thereby the advertiser) may be further improved.

B. Example Methods

Figure 3:
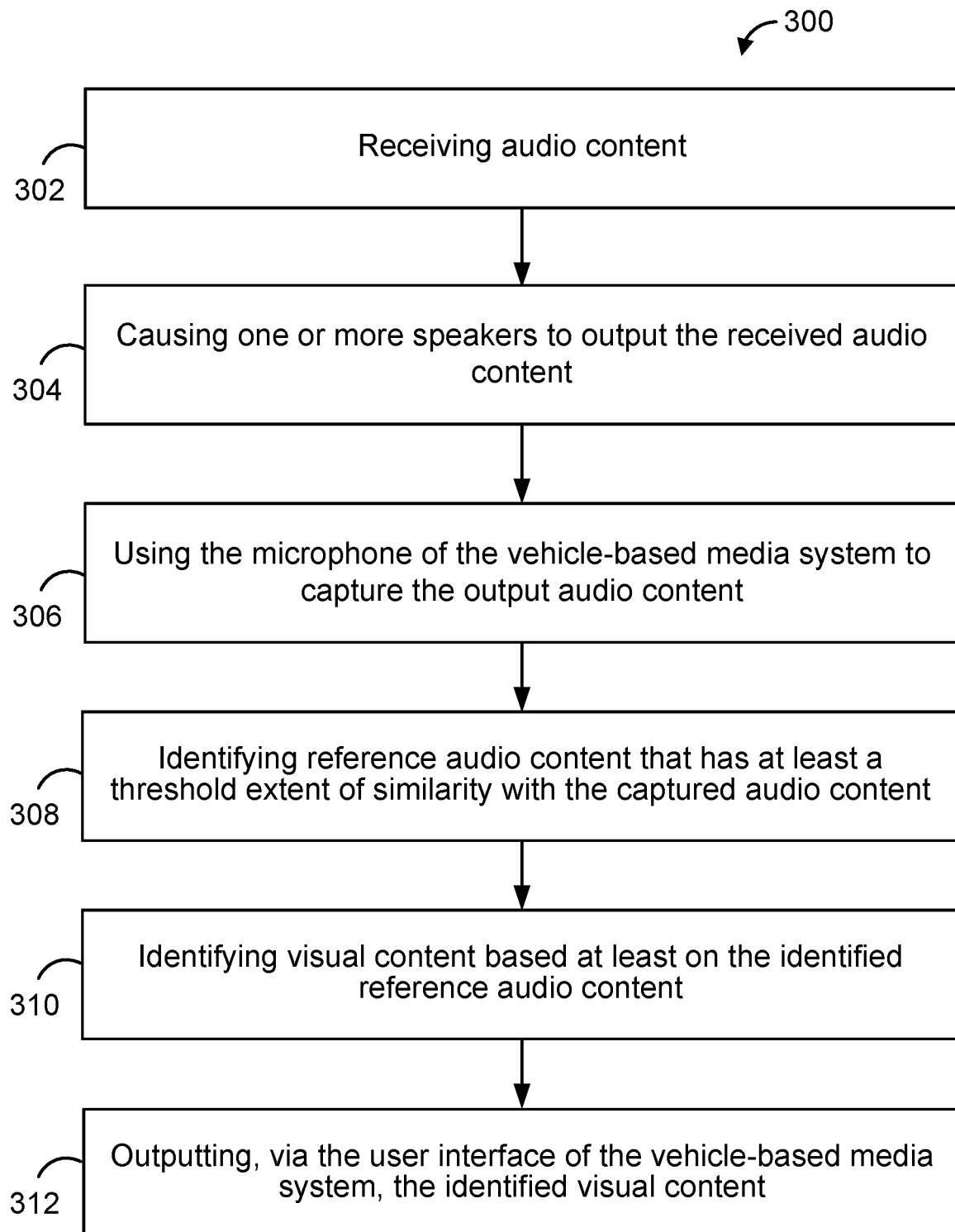
FIG. 3 is a flow chart of an example method.

FIG. 3 is a flow chart illustrating an example method 300.

At block 302, the method 300 can include receiving audio content. In some examples, receiving the audio content includes receiving primary audio content and secondary audio content, wherein the primary audio content comprises entertainment content, and wherein the secondary audio content comprises advertisement content interspersed among the primary content.

At block 304, the method 300 can include causing one or more speakers to output the received audio content. In some examples, causing the one or more speakers to output the received audio content includes causing the one or more speakers to output primary audio content (i.e., entertainment content) and secondary audio content (i.e., advertisement content).

At block 306, the method can include using the microphone of the vehicle-based media system to capture the output audio content. In some examples, using the microphone of the vehicle-based media system to capture the output audio content includes using the microphone of the vehicle-based media system to capture the secondary audio content.

At block 308, the method 300 can include identifying reference audio content that has at least a threshold extent of similarity with the captured audio content. In some examples, identifying reference audio content that has at least the threshold extent of similarity with the captured audio content includes identifying reference audio content that has at least the threshold extent of similarity with the captured secondary audio content. In some examples, identifying the reference audio content that has at least the threshold extent of similarity with the captured audio content includes: (i) generating audio fingerprint data of the captured audio content, (ii) comparing the generated audio fingerprint data to a plurality of reference audio fingerprint items, and (iii) determining that a particular reference audio fingerprint item of the plurality of reference audio fingerprint items has at least the threshold extent of similarity with the generated audio fingerprint data.

At block 310, the method 300 can include identifying visual content based at least on the identified reference audio content. In some examples, identifying visual content based at least on the identified reference audio content includes identifying visual content related to particular advertisement content of the secondary audio content. In some examples, each respective reference audio fingerprint item of the plurality of audio fingerprint items is associated with respective visual content and identifying visual content based at least on the identified reference audio content includes identifying the respective visual content associated with the particular reference audio fingerprint item that has at least the threshold extent of similarity with the generated audio fingerprint data.

At block 312, the method 300 can include outputting, via the user interface of the vehicle-based media system, the identified visual content. In some examples, outputting the identified visual content includes, while causing the one or more speakers to output the particular advertisement content of the secondary audio content, outputting the visual content related to the particular advertisement content. In some examples, outputting the visual content related to the particular advertisement content includes displaying a scannable image that, when scanned by an external computing device (e.g., a smartphone of an occupant of the vehicle), causes the external computing device to retrieve data associated with the particular advertisement content.

In yet other examples, displaying the scannable image comprises displaying a scannable image that, when scanned by the external computing device, causes the external computing device to (i) navigate to a web page associated with the particular advertisement content, (ii) retrieve a coupon associated with the particular advertisement content, or (iii) display an indication of a geographic location associated with the particular advertisement content. In other examples, outputting the visual content related to the particular advertisement content includes displaying an indication of a geographic location associated with the particular advertisement content. In yet other examples, outputting the visual content related to the particular advertisement content includes displaying additional advertisement content associated with the particular advertisement content.

In some examples, the method 300 can also include determining a geographic location of the vehicle-based media system and identifying visual content based at least on the identified reference audio content includes identifying visual content based on both (i) the identified reference audio content and (ii) the determined geographic location of the vehicle-based media system. As described above, this can allow the vehicle-based media system to retrieve and display location-specific visual content.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects.

The invention claimed is:

1. A vehicle-based media system comprising:
a user interface;
one or more processors; and
a non-transitory, computer-readable medium storing instructions that, when executed by the one or more processors, cause the vehicle-based media system to perform a set of operations comprising:
receiving audio content;
causing one or more speakers to output the received audio content;
determining that the received audio content does not include information indicating musical audio content;
in response to determining that the received audio content does not include information indicating musical audio content, identifying reference audio content that has at least a threshold extent of similarity with the received audio content;
identifying visual content based at least on the identified reference audio content, wherein the identified visual content comprises a scannable image that, when scanned by a computing device, causes the computing device to retrieve data associated with the identified reference audio content; and
outputting, via the user interface of the vehicle-based media system, the identified visual content.

2. The vehicle-based media system of claim 1, wherein receiving the audio content comprises receiving primary audio content and secondary audio content, wherein causing the one or more speakers to output the received audio content comprises causing the one or more speakers to output the primary audio content and the secondary audio content, wherein the primary audio content comprises entertainment content, and wherein the secondary audio content comprises advertisement content interspersed among the primary content.

3. The vehicle-based media system of claim 2, wherein identifying reference audio content that has at least the threshold extent of similarity with the received audio content comprises identifying reference audio content that has at least the threshold extent of similarity with the received secondary audio content.

4. The vehicle-based media system of claim 3, wherein identifying visual content based at least on the identified reference audio content comprises identifying visual content related to particular advertisement content of the secondary audio content, and wherein outputting the identified visual content comprises, while causing the one or more speakers to output the particular advertisement content of the secondary audio content, outputting the visual content related to the particular advertisement content.

5. The vehicle-based media system of claim 1, wherein displaying the scannable image comprises displaying a scannable image that, when scanned by the computing device, causes the computing device to navigate to a web page associated with the particular advertisement content.

6. The vehicle-based media system of claim 1, wherein displaying the scannable image comprises displaying a scannable image that, when scanned by the computing device, causes the computing device to retrieve a coupon associated with the particular advertisement content.

7. The vehicle-based media system of claim 1, wherein displaying the scannable image comprises displaying a scannable image that, when scanned by the computing device, causes the computing device to display an indication of a geographic location associated with the particular advertisement content.

8. The vehicle-based media system of claim 1, wherein outputting the visual content related to the particular advertisement content further comprises displaying an indication of a geographic location associated with the particular advertisement content.

9. The vehicle-based media system of claim 1, wherein outputting the visual content related to the particular advertisement content comprises displaying additional advertisement content associated with the particular advertisement content.

10. The vehicle-based media system of claim 1, wherein identifying the reference audio content that has at least the threshold extent of similarity with the received audio content comprises:
  generating audio fingerprint data of the received audio content;
  comparing the generated audio fingerprint data to a plurality of reference audio fingerprint items; and
  determining that a particular reference audio fingerprint item of the plurality of reference audio fingerprint items has at least the threshold extent of similarity with the generated audio fingerprint data.

11. The vehicle-based media system of claim 10, wherein each respective reference audio fingerprint item of the plurality of audio fingerprint items is associated with respective visual content, and wherein identifying visual content based at least on the identified reference audio content comprises identifying the respective visual content associated with the particular reference audio fingerprint item that has at least the threshold extent of similarity with the generated audio fingerprint data.

12. The vehicle-based media system of claim 1, wherein the set of operations further comprise determining a geographic location of the vehicle-based media system, and wherein identifying visual content based at least on the identified reference audio content comprises identifying visual content based on both (i) the identified reference audio content and (ii) the determined geographic location of the vehicle-based media system.

13. A method to be performed by a vehicle-based media system, the method comprising:
  receiving audio content;
  causing one or more speakers to output the received audio content;
  determining that the received audio content does not include information indicating musical audio content;
  in response to determining that the received audio content does not include information indicating musical audio content, identifying reference audio content that has at least a threshold extent of similarity with the received audio content;
  identifying visual content based at least on the identified reference audio content, wherein the identified visual content comprises a scannable image that, when scanned by a computing device, causes the computing device to retrieve data associated with the identified reference audio content; and
  outputting, via a user interface of the vehicle-based media system, the identified visual content.

14. The method of claim 13, wherein receiving the audio content comprises receiving primary audio content and secondary audio content, wherein causing the one or more speakers to output the received audio content comprises causing the one or more speakers to output the primary audio content and the secondary audio content, wherein the primary audio content comprises entertainment content, and wherein the secondary audio content comprises advertisement content interspersed among the primary content.

15. The method of claim 14, wherein identifying reference audio content that has at least the threshold extent of similarity with the received audio content comprises identifying reference audio content that has at least the threshold extent of similarity with the received secondary audio content.

16. The method of claim 15, wherein identifying visual content based at least on the identified reference audio content comprises identifying visual content related to particular advertisement content of the secondary audio content, and wherein outputting the identified visual content comprises, while causing the one or more speakers to output the particular advertisement content of the secondary audio content, outputting the visual content related to the particular advertisement content.

17. The method of claim 13, wherein displaying the scannable image comprises displaying a scannable image that, when scanned by the computing device, causes the computing device to (i) navigate to a web page associated with the particular advertisement content, (ii) retrieve a coupon associated with the particular advertisement content, or (iii) display an indication of a geographic location associated with the particular advertisement content.

18. A non-transitory computer-readable medium, having stored thereon program instructions that, upon execution by a vehicle-based media system, cause the vehicle-based media system to perform a set of operations comprising:
  receiving audio content;
  causing one or more speakers to output the received audio content;
  determining that the received audio content does not include information indicating musical audio content;
  in response to determining that the received audio content does not include information indicating musical audio content, identifying reference audio content that has at least a threshold extent of similarity with the received audio content;
  identifying visual content based at least on the identified reference audio content, wherein the identified visual content comprises a scannable image that, when scanned by a computing device, causes the computing device to retrieve data associated with the identified reference audio content; and
  outputting, via a user interface of the vehicle-based media system, the identified visual content.

* * * * *